May 1, 1962 P. M. LUCAS ET AL 3,032,268
COMPARATOR FOR NUMBERS EXPRESSED IN CONVENTIONAL AND REFLECTED BINARY CODES
Filed Dec. 3, 1958 5 Sheets-Sheet 1
Fig. 1
| Decimal numbers | Conventional binary code | | | | Reflected binary code | | | | |
|---|---|---|---|---|---|---|---|---|---|
| | 3 | 2 | 1 | 0 | order | 3 | 2 | 1 | 0 |
| 0 | 0 | 0 | 0 | 0 | | 0 | 0 | 0 | 0 |
| 1 | 0 | 0 | 0 | 1 | | 0 | 0 | 0 | 1 |
| 2 | 0 | 0 | 1 | 0 | | 0 | 0 | 1 | 1 |
| 3 | 0 | 0 | 1 | 1 | | 0 | 0 | 1 | 0 |
| 4 | 0 | 1 | 0 | 0 | | 0 | 1 | 1 | 0 |
| 5 | 0 | 1 | 0 | 1 | | 0 | 1 | 1 | 1 |
| 6 | 0 | 1 | 1 | 0 | | 0 | 1 | 0 | 1 |
| 7 | 0 | 1 | 1 | 1 | | 0 | 1 | 0 | 0 |
| 8 | 1 | 0 | 0 | 0 | | 1 | 1 | 0 | 0 |
| 9 | 1 | 0 | 0 | 1 | | 1 | 1 | 0 | 1 |
| 10 | 1 | 0 | 1 | 0 | | 1 | 1 | 1 | 1 |
| 11 | 1 | 0 | 1 | 1 | | 1 | 1 | 1 | 0 |
| 12 | 1 | 1 | 0 | 0 | | 1 | 0 | 1 | 0 |
| 13 | 1 | 1 | 0 | 1 | | 1 | 0 | 1 | 1 |
| 14 | 1 | 1 | 1 | 0 | | 1 | 0 | 0 | 1 |
| 15 | 1 | 1 | 1 | 1 | | 1 | 0 | 0 | 0 |
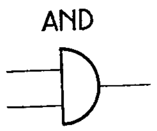
Fig. 2a
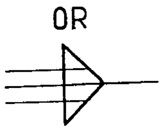
Fig. 2b
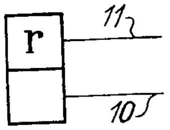
Fig. 2c
INVENTORS
Pierre Marie Lucas
Paul François Marie Gloess
By Otto John Munz
ATTORNEY INVENTORS
Pierre Marie Lucas
Paul François Marie Gloess
BY Otto John Munz
ATTORNEY May 1, 1962 P. M. LUCAS ET AL 3,032,268

COMPARATOR FOR NUMBERS EXPRESSED IN CONVENTIONAL AND REFLECTED BINARY CODES

Filed Dec. 3, 1958 5 Sheets-Sheet 3

INVENTORS

Pierre Marie Lucas

Paul François Marie Gloess

By Otto John Munz

ATTORNEY

3-DIGIT BINARY COARSE-TO-FINE CODE TRANSLATOR

INVENTORS
Pierre Marie Lucas
Paul François Marie Gloess
By Otto John Munz
ATTORNEY May 1, 1962 P. M. LUCAS ET AL 3,032,268

COMPARATOR FOR NUMBERS EXPRESSED IN CONVENTIONAL AND REFLECTED BINARY CODES

Filed Dec. 3, 1958 5 Sheets-Sheet 5

INVENTORS

Pierre Marie Lucas

Paul François Marie Gloess

By Otto John Munz

ATTORNEY 3,032,268

COMPARATOR FOR NUMBERS EXPRESSED IN CONVENTIONAL AND REFLECTED BINARY CODES

Pierre Marie Lucas, 11 Rue Abbe Derry, Issy-les-Moulineaux, France, and Paul Francois Marie Gloess, 50 Rue Michel Ange, Paris, France Filed Dec. 3, 1958, Ser. No. 777,925
Claims priority, application France Dec. 5, 1957
2 Claims. (Cl. 235—177)

The present invention concerns systems for the comparison of two numbers expressed in the conventional binary code and in reflected binary code, respectively.

In position indicating systems it is often convenient to express the value of a quantified magnitude in the form of a number expressed in the code known as reflected binary code, for the reason that in such a code when passing from one number to the next in the numerical scale only one digit is modified. This differs from the conventional binary code in which several digits may be changed simultaneously, as a result of which a whole series of incorrect numbers may be introduced transitorily if the changes are not absolutely simultaneous.

However, the reflected binary code, although desirable because of its immunity to coding errors in position indicating systems, is not appropriate for arithmetical calculations for which, on the contrary, the pure binary code is convenient.

As a result, when arithmetical calculations must be made with binary numbers one of which at least is expressed in reflected binary code, it is convenient to convert the said reflected code binary number into conventional binary code. In particular, this is the case when an error signal in encoded form is to be derived from a first conventional code binary number representing a data or address and a second reflected code binary number representing the actual position of a movable element such as a movable object like a pointer or a movable source of light.

To render this idea more precise, there will now be described by way of example the case in which the variable magnitude to be controlled is the position on an axis of a movable element which is to be brought under control to the point the abscissa of which is defined in digital encoded form by a conventional binary address number of $n$ digits. The movable element in question may be, for example, a luminous spot on the screen of a cathode ray tube and it is desired to bring this spot to a given address; it will be supposed that the two co-ordinates of the spot on the screen are of separate interest and only one of them, the abscissa for example, will be considered. The effective position of the movable spot is expressed in reflected binary code of $n$ digits by any suitable coding means.

Light from the spot is focused onto a code plate employing columns of opaque and nonopaque areas or onto a metallic plate having holes punched out, each of which column defines a different reflected binary code number. Each digit position of a number is defined by the presence or absence of a hole in the code plate. Corresponding digit positions in each column form rows of digit representations, so that the first digit positions of each column, for example, form a first row. A light sensitive device is provided for each row of the code plate and provision is made to allow light passing through the punched areas in a row of the code plate to strike only the corresponding light sensitive device. A cylindrical lens system is positioned between the cathode ray tube screen and the code plate such that light emanating from the light spot on the screen is focused into a ribbon beam impinging on the code plate in the form of a luminous vertical line or column. Light passing through the holes of said column will be picked up by the photosensitive devices and converted into electrical pulses therein indicative of the abscissa of the planar position of the light spot. Due to the choice of the reflected binary code, when the abscissa of the light spot varies, only one digit of the encoded abscissa changes at a time.

The problem which then arises is as follows: knowing the address to be obtained in conventional binary code as well as the effective position of the movable spot in reflected binary code, to obtain a digital error signal which is appropriate in amplitude and sign for operating the deflection system of the cathode ray tube in order to bring the spot to the address which is to be reached.

It is clear that one of the solutions of this problem consists in computing the error signal in conventional binary code with an indication of the sign. This has the drawback that it necessitates an excessive number of counting members.

Another solution would be to convert the reflected binary code number into a conventional binary code number and to derive from the address number and the said converted number a digital error signal expressed in a three digit binary code of which the digits are +1, zero and −1. If no special conditions are imposed on this numbering, it is easy to obtain the error or difference signal, but its utilization is less easy. This will be explained later.

The conversion of a reflected binary code number into a conventional binary code number is easily accomplished. Once this conversion is made, in each stage there can quickly be obtained a difference, term by term, with the result expressed in the three digit binary code without carryover. The result is +1, zero or −1. If now the error signal, sensed stage by stage, with weighting of the results, controls the deflecting means of the spot beginning with the highest order, the spot may in certain cases reach the address only after oscillations of large amplitude. If in fact the error signal is represented by the three digit binary code number:

$$+1 \quad -1 \quad -1 \quad -1$$

its real decimal value is +1 and yet the presence of the digit 1 at the third order will first send the movable spot to the abscissa decimal value eight when this order is tested.

There are several possible three digit binary enumerations for the same number. That given above could also be written:

$$0 \quad +1 \quad -1 \quad -1$$

or $$0 \quad 0 \quad +1 \quad -1$$

or again $$0 \quad 0 \quad 0 \quad +1$$

It is therefore possible to impose on the three digit binary code numbers conditions which will make more rational the utilization of the difference as a digital error signal in a servo-mechanism.

The principal object of the present invention is to provide a device permitting two numbers expressed the one in conventional binary code and the other in reflected binary code to be compared and allowing the difference of these two numbers to be deduced from the comparison in a digital three digit binary encoded form suitable for use as an error signal.

In the device according to the invention, this difference is obtained in digital three digit binary encoded form that is to say in the form of a number formed of binary digits +1, −1, and 0 having respective weights equal to successive powers of two according to their orders, the digit −1, at the binary order $p$ having a decimal value of $-2^p$. Thus this code, although having three digits, is not a ternary code but a binary code with negative bits. It will be called "three digit binary coarse code."

Of all the possible three digit binary codes one is selected such that in the difference expressed in the form of a number of $n$ digits each having one of the values +1, zero or −1, two digits having the value 1 and of opposite sign never follow each other. The $n$ digits thus distribute themselves in sub-groups comprising only the +1 values or only −1 values separated by at least one zero digit. This particular code will be called "three digit binary fine code."

One object of the invention is the conversion into a three digit binary code complying with the preceding condition of a number previously expressed in the same code but not complying with this condition.

A more precise object of the invention is a converter complying with the preceding object in which the simultaneous conversion of the various orders brings into play only three successive orders at the most.

According to the invention this object is fulfilled by applying successively the following rules:

If a digit is preceded by a digit of opposite sign, its sign must be reversed.

If a digit is followed by a digit of opposite sign it must be replaced by zero.

The apparatus of the invention uses only coincidence circuits, or gates, of a standard type, each having no more than three inputs. These coincidence circuits are of only two kinds: those in which an information signal is present at the output only when information signals are simultaneously present at all the inputs will be called "and" gates, and those in which an information signal is present at the output each time that an information signal appears at at least one of the inputs will be called "or" gates.

The invention will be better understood from the following detailed description, which refers to the accompanying drawings, in which:

FIGURE 1 is a table showing the equivalence between binary numbers in conventional binary code and reflected binary code having the same decimal value;

FIGURES 2*a*, 2*b* and 2*c* show the symbols adopted for the coincidence circuits or gates;

Figure 3:
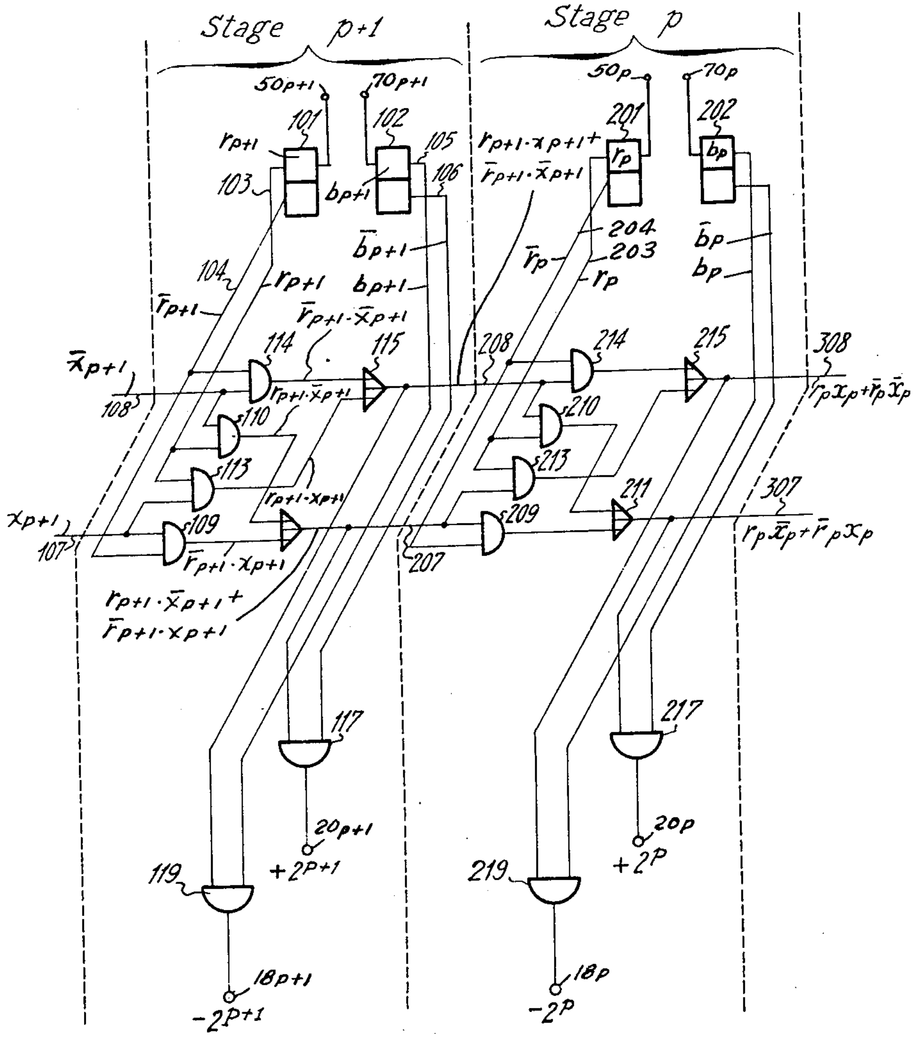
FIGURE 3 shows diagrammatically the subtractor part of the comparator giving the difference number in three digit binary coarse code.

As already said in the preamble, the comparator of the invention can be utilised for sending a point source of light to a given address. This is illustrated in the drawing of FIG. 6 which relates to a storage system of the type called "flying spot store."

Figure 6:
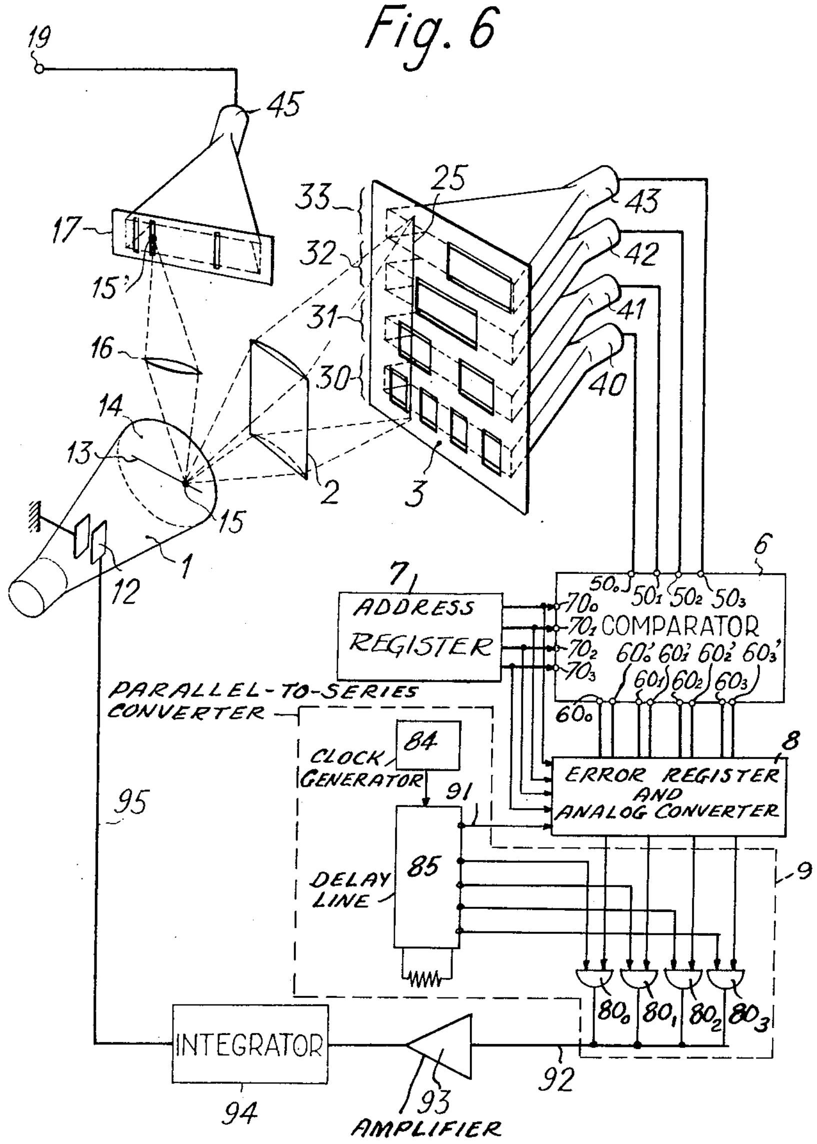
FIGURE 6 is a drawing illustrating an example of possible utilization of the comparator of the invention.

Referring first to FIG. 6, reference 1 designates a cathode ray tube; the position of the spot 15 on the screen 14 of said tube depends on the values of two coordinates, but it will be assumed that these two coordinates can be considered separately and only one of them will be taken into account and will be supposed to constitute the total address. Thus, spot 15 can be displaced on straight line 13 and the address is a given encoded value of the abscissa along said straight line.

For bringing the spot to the given address the said address in digital conventional binary form is sent from the address register 7, through the error register and analog converter 8, the parallel-to-series converter 9, the amplifier 93, the integrator 94 and the lead 95 to one of the horizontal deflection plates 12 of the cathode ray tube 1. Address registers are well known in the art and a type of such a register is for example described in "Pulse and Digital Circuits" by Jacob Millman and Herbert Taub, McGraw-Hill Book Company, Inc., New York, 1956, page 412, FIGS. 13–226. Analog converters converting a binary number stored in a register into a plurality of analog values, bit by bit, taking into account the weight of the converted bit, are also known in the art (see for example analog converter 18 in U.S. Patent 2,830,285 to R. C. Davis et al., issued April 8, 1958). The parallel-to-series converter 9 comprises a clock generator 84, a delay line 85 terminated by its characteristic resistance, receiving clock pulses from generator 84 and having a plurality of equally distributed taps and "and" gates $80_0$–$80_3$. The inputs of said gates are connected on the one hand to a tap of delay-line 85 and on the other hand to an output of analog converter 8. The outputs of said gates are connected in parallel to amplifier 93 via lead 92. Issuing of analog values from analog converter 8 is controlled by the first tap of the delay line and at successive instants the said analog values corresponding to the different orders of the binary address are allowed to pass through converter 9.

As amplifier 93, one can take any well known linear pulse amplifier such as those discussed in Chapter 3 of the previously cited reference by Millman and Taub. Integrator circuits are disclosed at page 46 of the same book.

The sensing of the actual position of spot 15 along straight line 13 is effected by means of a code plate 3 provided with a code constituted of rows of holes, four in the case of the figure, which are denoted by reference 30–33. Light emanating from the source 15 is concentrated substantially in a ribbon beam by the cylindrical lens 2 which performs the correspondence of line 25 (which covers each of rows 30–33) with the actual position of spot 15.

These four rows of holes correspond each to a binary order of the number defining the abscissa of spot 15 along straight line 13; $2^4$, that is sixteen quantified values of that abscissa, are so defined and sensed. The binary code is a reflected one, which is more convenient than the conventional binary code for instantaneous sensing of the position of the flying spot: this has already been explained. Cooperating with each row 30—33 of code plate 3 are four light sensitive devices 40–43 and provision is made as already said to allow light passing through the holes in a row of the code plate to strike only the corresponding light sensitive device. The light sensitive devices provide electrical signals at terminals $50_0$–$50_3$ representing the digits of the actual coordinate of the spot encoded in reflected binary code. The reflected binary code number thus obtained is applied to the comparator of the invention hereinafter described.

The function of this comparator is to compare the digital number applied on input terminals $50_0$–$50_3$ (representing the actual position of spot 15 along the straight line 13) to the digital number applied on input terminals $70_0$–$70_3$ (representing the address), and to derive therefrom an error signal adapted to control the position of spot 15 until it reaches the address designated by address register 7. This address is supplied on terminals $70_0$–$70_3$ in the form of a conventional binary code number.

The comparator 6 turns out the difference between the actual position of the spot and the address in the three digit binary fine code; it is provided with four pairs of three digit binary output terminals $60_0$–$60_3$ and $60_0'$–$60_3'$. In a couple of terminals such as $60_0$–$60_0'$, for example, a signal is present on terminal $60_0$ (corresponding to digit +1), or on terminal $60_0'$ (corresponding to digit −1) or no signal at all is present (corresponding to digit 0).

Spot 15 is also focussed at 15' by means of lenses such as 16 onto a plurality of information plates 17 (only one code plate is represented in FIG. 6) which have opaque and nonopaque areas forming information words. The bits of said words are read by light sensitive devices such as 45 and are available at output terminals such as 19. In FIG. 6 for convenience purposes an information plate having a single row has been represented but it may be well understood that if the words have several bits, the plate 17 must have as many rows as bits and that point image 15' has to be a line image similar to 25.

The operation of the system is the following: assuming that the address register 7 applies to terminals $70_0$, $70_1$, $70_2$, $73_3$ an address which is not the actual position of the spot 15, the comparator 6 computes the difference, which is transferred into error register and analog converter 8 at times controlled by clock generator 84. Then, corresponding signals are sent successively to amplifier 93 through "and" gates $80_0$, $80_1$, $80_2$, $80_3$. Spot 15 is displaced in a quantified manner, and finally reaches its address; the comparator 6 computes then a difference which is zero, and the spot is steady. A reading can be performed on output terminals such as 19.

In order to provide a high speed of reading, the rate of the clock generator is as high as possible. Nevertheless, if this rate is too high, the spot is not allowed to reach its address at the end of the cycle, and a new cycle is necessary.

The fewest are the reversals of the sense of displacement of the spot when reaching its address, the highest can be the rate of the clock generator, and the ideal condition is that there be no sign reversal between two successive signals on terminals $60_0$, $60_1$, $60_2$, $60_3$ and $60_0'$, $60_1'$, $60_2'$, $60_3'$. It has been already explained that this solution would involve an excessive complexity in the comparator.

In the comparator described hereinafter, the following condition is obtained: in the difference expressed in a three digit binary fine code all transitions such as $-1$ $+1$ and $+1$ $-1$ which would be present in a three digit binary coarse code are removed.

Now, some general considerations about the reflected binary code will be recalled.

FIGURE 1 shows the first sixteen decimal numbers expressed on the one hand in conventional binary code and on the other hand in reflected binary code by means of numbers of four binary digits or bits. It will be remembered that the transfer from conventional binary code to reflected binary code is effected by reading the digits starting from that of highest order and by noting the changes of digits in the conventional binary code. A change of digit is translated by the digit 1 in the reflected binary code, and the absence of a change is represented by zero. The conversion in the opposite direction, with which the comparator of the invention is specifically concerned, is obtained by reading the digits of the reflected binary number starting with that of highest order and by noting whether the number of digits 1 which are encountered up to the digit considered, the latter being included, is even or odd. If this number is even the corresponding binary digit is zero, if it is odd the corresponding binary digit is 1.

In the following the total number of binary digits necessary to enumerate all the possible addresses will be called $n$, and the order of any binary digit forming part of a number of $n$ digits will be called $p$. The digit of lowest order will be said to be of zero order, the following of order 1 and so on until $(n-1)$ so that in the expression of the number in conventional binary code the figure of order $p$ is assigned the value $2^p$.

FIGURES 2*a* and 2*b* show the symbols adopted to represent the "and" and "or" coincidence circuits or gates, respectively. There are two inputs to the "and" gate of FIG. 2*a* and three inputs to the "or" gate of FIG. 2*b*. FIG. 2*c* represents a flip-flop or trigger circuit having two stable positions. In this flip-flop, 11 is the "1" output and 10 is the "0" output.

Figure 5:
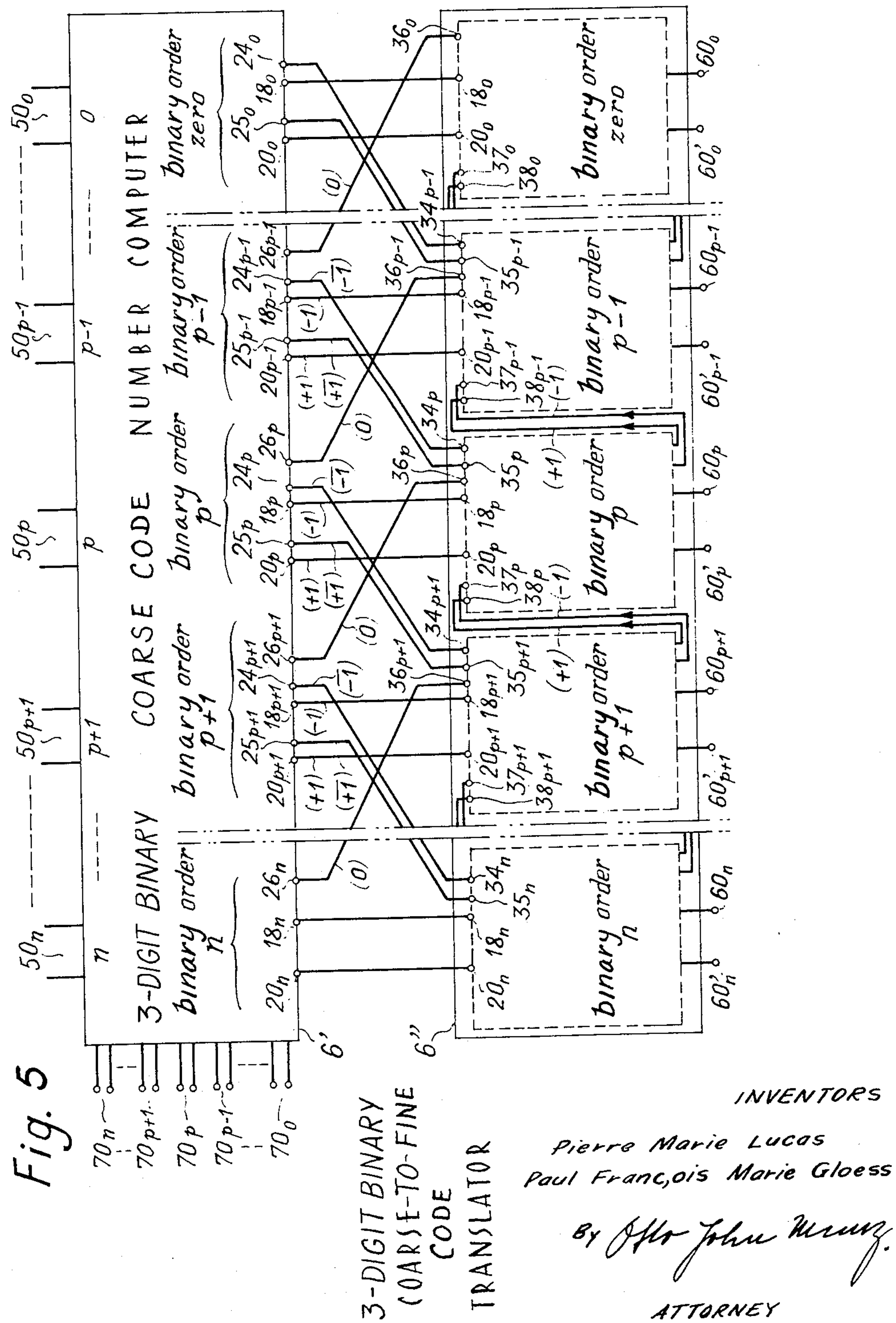
FIGURE 5 is a block diagram of the comparator showing the two parts of the same: the subtractor and the translator.

Referring now to FIG. 5, it is seen that the comparator 6 comprises two stages, namely a three digit binary coarse code number computer or subtractor 6' and a three digit binary coarse-to-fine code translator 6''.

The computer 6' receives by its input terminals $50_0, \ldots 50_{p-1}, 50_p, 50_{p+1}, \ldots 50_n$ the digits of the reflected binary code output number and, by its input terminals $70_0, \ldots 70_{p-1}, 70_p, 70_{p+1}, \ldots 70_n$, the digits of the conventional binary code address number. It translates the reflected binary code output number into the corresponding conventional binary code output number and subtracts, binary digit by binary digit, the said conventional binary code output number from the said conventional binary code address number. The result is a difference number expressed in the so-called three digit binary coarse code comprising the digits $+1$, 0, $-1$, in which the groups of digits $(+1, -1)$ and $(-1, +1)$ may be encountered. The digits $(-1)$ of the successive binary orders appear at terminals $18_0, \ldots 18_{p-1}, 18_p, 18_{p+1}, \ldots 18_n$, the digits $(+1)$ at terminals $20_0, \ldots 20_{p-1}, 20_p, 20_{p+1}, \ldots 20_n$ and the digits 0 at terminals $26_0, \ldots 26_{p-1}, 26_p, 26_{p+1}, \ldots 26_n$. Besides two sets of supplementary terminals are provided $24_0$ to $24_n$ and $25_0$ to $25_n$. At terminals $24_0$ to $24_n$ there appears a signal when no signal issues from the corresponding terminal $18_0$ to $18_n$ of the same stage; this signal will be called $(-\bar{1})$. Similarly at terminals $25_0$ to $25_n$ there appears a signal when no signal issues from the corresponding terminal $20_0$ to $20_n$ of the same stage; this signal will be called $(+\bar{1})$.

The translator 6'' receives by its input terminals of a given binary order (say order $p$) $18_p$ and $20_p$ the digits $+1$ or $-1$ coming from the terminals of the same order in computer 6'. It receives by terminal $36_p$, connected to terminal $26_{p+1}$ of the antecedent order in computer 6' the digit 0 from said last order. It receives by terminals $34_p$ and $35_p$, respectively connected to terminals $24_{p-1}$ and $25_{p-1}$ of the subsequent order in computer 6' the conditions $(-\bar{1})$ and $(+\bar{1})$ given by said last order. It receives lastly by terminals $37_p$ and $38_p$ the digits $-1$ or $+1$ from a first pair of output terminals of the antecedent order in translator 6''. Such digits do not represent the final digits, at order $(p+1)$, of the three digit binary fine code difference number, but a provisional result as will be explained hereinafter. The stage 6'' gives, through a second pair of output terminals $60_p$ and $60_p'$, the digit of order $p$ of the three digit binary fine code difference number.

In brief, a given order stage of translator 6'' receives the following data:

(*a*) The digit $+1$ or $-1$ of the same order in the three digit binary coarse code number computer;
(*b*) The digit 0 of the antecedent order in said computer;
(*c*) The digit $+1$ or $-1$ representing the provisional result at the antecedent order in the translator;
(*d*) The conditions $(+\bar{1})$ or $(-\bar{1})$ at the subsequent order in the three digit binary coarse code number computer.

From data *a*, *b* and *c*, the part of the translator 6'' of binary order $p$ derives the provisional digit of order $p$, and from said provisional digit and data *d*, the said part derives the final digit of order $p$.

The translator 6'' may operate according to two modes of operation. It may consider the three digit binary coarse code number by groups of two successive digits and achieve the transformation:

(i) $(-1, +1)$ into $(0, [-1])$
(ii) $(+1, -1)$ into $(0, [+1])$

In this case, the digit which is bracketed is a provisional one and is subjected to be changed into 0 due to the value of the digit of lower order in the three digit binary coarse code number. In order that the translator should give directly resulting digit without successive changes to an already found digit, the translator considers preferably the three digit binary coarse code number by groups of three successive digits and the digit bracketed is allowed to issue only if the digit of immediately lower order is $(+\bar{1})$ in case i and $(-\bar{1})$ in case ii. If these conditions are not fulfilled, the bracketed digit is changed into 0.

The following table shows six groups of three successive digits which have to be modified by the translator and the corresponding modified groups:

| | | | | | | | | |
|---|---|---|---|---|---|---|---|---|
| −1 | +1 | 0 | | | | 0 | [−1] | 0 |
| −1 | +1 | −1 | | | | 0 | [−1] | −1 |
| +1 | −1 | 0 | | | | 0 | [+1] | 0 |
| +1 | −1 | +1 | | | | 0 | [+1] | +1 |
| −1 | +1 | +1 | 0 | [−1] | +1 | 0 | [ 0] | −1 |
| +1 | −1 | −1 | 0 | [+1] | −1 | 0 | [ 0] | +1 |

In the four former groups, after modification, the median digit is obtained directly (bracketed digit). In the fifth modified group, the median digit would be provisionally −1 and finally 0 if the digits were taken two by two. By considering the digit of lower order +1, the final result 0 is directly found. In the sixth modified group, the median digit would be provisionally +1 and finally 0 if the digits were taken two by two. By considering the digit of lower order −1, the final result 0 is directly found.

FIG. 3 shows two consecutive stages of the computer 6' giving the difference between the reflected binary code output number and the conventional binary code address number, said difference being expressed in the three digit binary coarse code. As already said, it is possible to find in this difference two successive digits having the value unity and of opposite sign.

In this figure, the reference numerals, the hundred digit of which is 1 indicate elements belonging to the stage of binary order $(p+1)$ and the reference numerals the hundred digit of which is 2 indicate elements belonging to the stage of binary order $p$.

The reference numerals 101 and 201 indicate bi-stable circuits having two conditions of equilibrium, namely an "on" position and an "off" position. These bi-stable circuits represent the digits of order $(p+1)$, and of order $p$ of the reflected binary code output number. They are controlled through input terminals $\mathbf{50}_{p+1}$ and $\mathbf{50}_p$.

When the digit of order $(p+1)$ of the reflected binary code output number is equal to 1, the bi-stable circuit 101 is in its "on" position and an information signal is found on the output conductor 103 whilst no information signal is present on the output conductor 104. The presence of a high potential on a given conductor is considered as an information signal on said conductor, and the presence of a low potential on this same conductor is considered as the absence of information signal on the latter. When the digit of order $(p+1)$ is equal to zero, the situation of conductors 103 and 104 is reversed.

If an information signal is present on the output conductor 103, it will be called $r_{p+1}$. If an information signal is present on the output conductor 104, it will be called $\bar{r}_{p+1}$. $r_{p+1}$ is equal to 0 or 1 and respectively $\bar{r}_{p+1}$ is equal to 1 or 0. Then we have:

$$r_{p+1}+\bar{r}_{p+1}=1 \quad (1)$$

The reference numerals 102 and 202 represent bi-stable circuits belonging to address register 7, in which is stored in pure binary code the number constituting the desired address. The conventions relating to the information signals provided by these bi-stable circuits are analogous to those already stated. These information signals will also be called $b_{p+1}$ and $\bar{b}_{p+1}$ for output conductors 105 and 106, respectively. Trigger circuits 102 and 202 are controlled through input terminals $\mathbf{70}_{p+1}$ and $\mathbf{70}_p$.

The reference numerals 109, 110, 113, 114, 117 and 119 indicate "and" gates and reference numerals 111 and 115 indicate "or" gates.

The $(p+1)$ stage is connected to the preceding stage by the conductors 107 and 108 on which there appears either the information signal $x_{p+1}$ or the information signal $\bar{x}_{p+1}$. If there is no preceding stage the signal $\bar{x}_{p+1}$ is present.

It is desired to obtain the information relating to the difference $(r_{p+1}-b_{p+1})$ between the two digits $r_{p+1}$ and $b_{p+1}$ at the terminals $\mathbf{18}_{p+1}$ and $\mathbf{20}_{p+1}$, said difference being expressed in the three digit binary coarse code. An information signal on terminal $\mathbf{20}_{p+1}$ will have a value of $+2^{p+1}$, and an information signal on the terminal $\mathbf{18}_{p+1}$ will have a value $-2^{p+1}$.

The "and" gate designated by 114 receives at its input the signal $\bar{r}_{p+1}$ and the signal $\bar{x}_{p+1}$. At its output there appears the signal $\bar{r}_{p+1}\bar{x}_{p+1}$. In the same way there appear at the outputs of the gates 110, 113 and 109 respectively the signals $r_{p+1}\bar{x}_{p+1}$, $r_{p+1}x_{p+1}$ and $\bar{r}_{p+1}x_{p+1}$.

At the output of the "or" gate designated by 115, that is to say on the conductor 208, there appears the signal $r_{p+1}x_{p+1}+\bar{r}_{p+1}\bar{x}_{p+1}$, and at the output of the gate 111 (i.e. on conductor 207) there appears the signal $$r_{p+1}\bar{x}_{p+1}+\bar{r}_{p+1}x_{p+1}$$

In the particular case in which the $(p+1)$ stage is that of highest order, i.e. in the case where $p+1=n$, $\bar{x}_n=1$, and $x_n=0$. There is therefore $\bar{r}_n$ on the conductor 208 and $r_n$ on the conductor 207.

On the output conductors 308 and 307 of the stage $p$ there appear the respective signals:

$$r_{p+1}.r_p+\bar{r}_{p+1}.\bar{r}_p$$

and $$\bar{r}_{p+1}.r_p+r_{p+1}.\bar{r}_p$$

and since $r_{p+1}+\bar{r}_{p+1}=1$ and $r_p+\bar{r}_p=1$, this second expression can be written:

$$r_p+r_{p+1}-2r_p.r_{p+1}$$

which is the remainder modulo 2 of:

$$r_{p+1}+r_p$$

There is therefore obtained on the output conductor of the stage of order $q$:

$$r_n+\ldots+r_{p+1}+r_p+\ldots+r_q$$

which is none other than the digit of order $q$ in conventional binary code. The information signals present on the conductors 107, 207 and 307 represent respectively the digits of orders $p+2$, $p+1$ and $p$ of the number in reflected binary code converted into conventional binary code.

On the conductors 108, 208 and 308 there are signals corresponding to the complementary digits of those on the conductors 107, 207 and 307.

The gates 117 and 119 compare two conventional binary digits of weight equal to $2^{p+1}$: one of these digits appears in the form of an information signal on one of the conductors 105 or 106 and this is the address digit; the other appears in the form of an information signal on one of the conductors 207 or 208 and this is a digit of the spot actual position word, previously originating from the reflected binary code plate and converted into conventional binary code by the circuitry of FIG. 3.

If in the stage $(p+1)$, for example, the conventional binary digits entered on the one hand in the circuit 102 and on the other hand on one of the conductors 207 or 208 are equal, no signal appears either at the terminal $\mathbf{20}_{p+1}$ or at the terminal $\mathbf{18}_{p+1}$. If the digit of the address is 1, and that of the converted output number zero, a signal appears at the terminal $\mathbf{18}_{p+1}$. If the digit of the address is zero and that of the converted output number 1, a signal appears at the terminal $\mathbf{20}_{p+1}$.

The information signals present at the outputs $\mathbf{20}_p$ and $\mathbf{18}_p$ represent therefore the digit of order $p$ of the difference between the converted output number and the address, expressed in the so-called three digit binary coarse code; in this code there is no prescribed relationship between one digit and the adjacent digit.

The translation from the three digit binary coarse code into the so-called three digit binary fine code according to the object of the invention is carried out according to the following rules: if in the three digit binary coarse code the doublet $(+1, -1)$ occurs, it is to be replaced by its equivalent $(0, +1)$; if the doublet $(-1, +1)$ is found, it is to be replaced by its equivalent $(0, -1)$. This means that if $A_p$ represents the digit of order $p$ of the three digit binary coarse code difference $$(A_p=+1, 0 \text{ or } -1):$$

If $A_{p+1}$ is of opposite sign to $A_p$, reverse the sign of $A_p$;

If $A_{p-1}$ is of opposite sign to $A_p$, replace $A_p$ by zero. This can be stated in a more precise form as follows:

*Operation I*

If the digit of order $(p+1)$ is not equal to zero and is preceded by a digit of order $(p+2)$ which is not zero and which is of opposite sign, reverse the sign of the digit of order $(p+1)$.

*Operation II*

If Operation I has been carried out on the digit of order $(p+1)$, replace the digit of order $(p+2)$ by zero.

Figure 4:
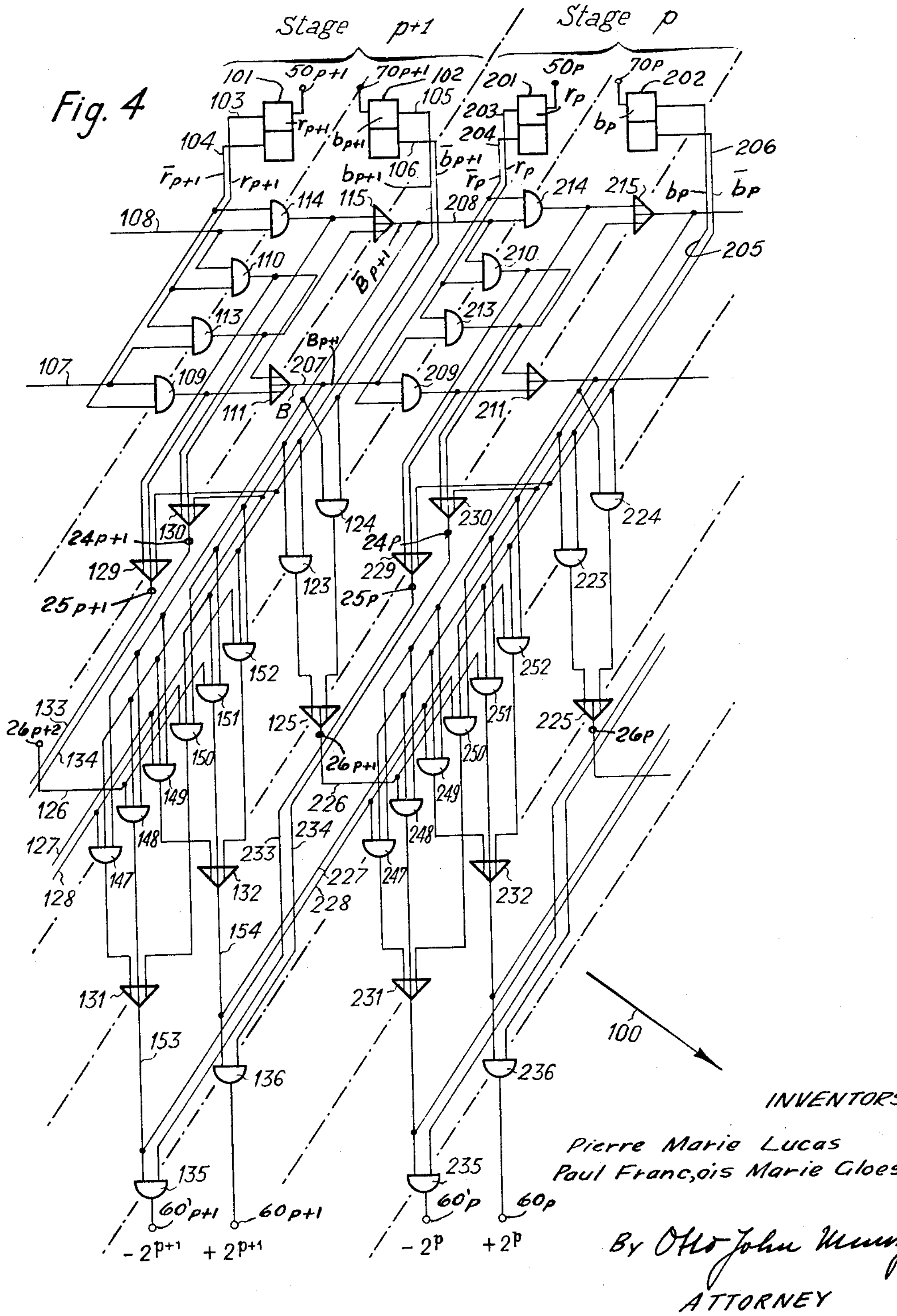
FIGURE 4 represents diagrammatically the translator part of the comparator giving the difference number in three digit binary fine code.

FIGURE 4 is a diagram of an embodiment of the invention which enables the expression for the difference stated in three digit binary coarse form to be converted by the application of the preceding rules.

In this diagram some of the elements of FIG. 3 are repeated, namely in the case of the stage $(p+1)$: the bistable circuits 101 and 102, the "and" gates 109, 110, 113 and 114, the "or" gates 111 and 115, and the conductors 207 and 208 on which appear the result of the conversion from the reflected binary code into the conventional binary code. The information signals existing on these conductors will be called respectively $B_{p+1}$ and $\bar{B}_{p+1}$.

The "and" gates 123 and 124 provide respectively the information signals $b_{p+1}B_{p+1}$ and $\bar{b}_{p+1}\bar{B}_{p+1}$. The "or" gate 125 provides an information signal $$b_{p+1}B_{p+1}+\bar{b}_{p+1}\bar{B}_{p+1}$$

There is therefore a signal at terminal $\mathbf{26}_{p+1}$ and on conductor 226 when the digit expressing the three digit binary coarse code difference is zero at stage $(p+1)$, the two digits in conventional binary code corresponding to the address and to the output number, being equal.

In the same way the conductor 126 coming from the stage $(p+2)$ carries a signal when the digit expressing the three digit binary coarse code difference is zero at this stage.

It will be seen that the "or" gate 129 produces a signal at terminal $\mathbf{25}_{p+1}$ and on the conductor 133 when the digit of order $(p+1)$ of the three digit binary coarse code difference is not equal to $+1$ (cf. condition $(\overline{+1})$ on terminal $\mathbf{25}_{p+1}$ of FIG. 5) and that the gate 130 produces a signal at terminal $\mathbf{24}_{p+1}$ and on the conductor 134 when the digit of order $(p+1)$ of the three digit binary coarse code difference is not equal to $-1$ (cf. condition $(\overline{-1})$ on terminal $\mathbf{24}_{p+1}$ of FIG. 5). In the stage of order $p$ these information signals are present respectively at terminals $\mathbf{25}_p$ and $\mathbf{24}_p$ and on conductors 233 and 234 (equivalent to the conductors of FIG. 5 connecting respectively terminals $\mathbf{25}_p$ and $\mathbf{35}_{p+1}$ and terminals $\mathbf{24}_p$ and $\mathbf{34}_{p+1}$).

Let it now be supposed that an information signal appears on conductor 127 or 128 when the digit resulting from Operation I in stage $(p+2)$ is respectively equal to $+1$ or $-1$ (conductors 127 and 128 are equivalent to conductors connected to terminals $\mathbf{37}_{p+1}$ and $\mathbf{38}_{p+1}$ of FIG. 5).

The "and" gates 147, 148 and 149 have two inputs which are the same as those of gate 119 (FIGURE 3) and in addition they have a third input which receive respectively the information signals transmitted by the conductors 128, 126 and 127.

The "and" gates 150, 151 and 152 have two inputs which are the same as those of the gate 117 (FIGURE 3) and in addition have a third input which receives respectively the information signals transmitted by the conductors 128, 126 and 127.

An information signal appears on the output conductor 153 of the "or" gate 131, the inputs of which are connected to the outputs of the gates 147, 148 and 150, if the following conditions are combined:

The digit of order $(p+1)$ of the three digit binary coarse code difference is equal to $-1$ and the digit of order $(p+2)$, as it results from the Operation I in this stage, is equal to $-1$ or zero, or again if the digit of order $(p+1)$ is equal to $+1$ and the digit order $(p+2)$ is equal to $-1$.

An information signal is present on the output conductor 154 of the "or" gate 132 if the following conditions are combined:

The digit of order $(p+1)$ of the three digit binary coarse code difference is equal to $+1$ and the digit of order $(p+2)$, as resulting from Operation I in this stage, is equal to $+1$ or to zero, or again if the digit of order $(p+1)$ is equal to $-1$ and the digit of order $(p+2)$ is equal to $+1$.

Consequently the resultant of Operation I for the stage of order $(p+1)$ appears on the conductors 153 and 154. This resultant is transmitted on conductors 227 and 228 to the stage of order $p$. This justifies a posteriori the supposition which has been made concerning the conductors 127 and 128 of the preceding stage.

Operation II is effected by the "and" circuits, such as 135 and 136, the inputs of which are on the one hand the conductors 153 and 154 and on the other hand the conductors 233 and 234 (analogous to the conductors 133 and 134, which transmit the information signals which have already been described).

Finally, an information signal appears at the output terminal $\mathbf{60'}_{p+1}$ if the conditions which result in the presence of an information signal at the output of gate 131 are fulfilled and if, in addition, the digit of order $p$ of the difference obtained in the three digit binary coarse code is not equal to $+1$. This information signal constitutes the digit of order $(p+1)$ of the difference to which is assigned the value $-2^{p+1}$.

In the same way, there appears at the output terminal $\mathbf{60}_{p+1}$ the digit of order $(p+1)$ of the difference, having the value $+2^{p+1}$, if the conditions which ensure the presence of an information signal at the output of the gate 132 are fulfilled and if in addition the digit of order $p$ of the difference obtained in the three digit binary coarse code is not equal to $-1$.

Summarizing, the Operation I is effected by the group comprising the gates 147 to 152, 131 and 132, which reverse the digit of order $(p+1)$ of the difference number expressed in the three digit binary coarse code when the preceding digit has an opposite sign and do not reverse it when the preceding digit has the same sign or is equal to zero; and Operation II is effected by the gates 135 and 136 which allow information relating to the digit of order $(p+1)$ to pass only if the digit of order $p$ is zero or has the same sign as that of order $(p+1)$.

The information signals relating to the elaboration of the difference expressed in the three digit binary fine code therefore travel from the stage of highest value and pass through a certain number of gates which are alternately "and" and "or" crcuits.

FIG. 4 is drawn in such a manner that all the gates of the same kind which are reached at the same time by the propagation of the information signals are found on straight lines inclined at 45°, assuming that the propagation time through a gate is the same for all of them. The information travels in the direction of the arrow 100.

What we claim is:

1. A comparator for subtracting a binary address number expressed in the conventional binary code from a binary information number expressed in the reflected binary code and for issuing a final difference number expressed in a binary code having the three digits +1, −1 and 0 and in which at least one 0 is always inserted between two digits equal to unity and of opposite sign comprising means for converting said reflected binary code information number into a conventional binary code information number, means for obtaining a first difference number by subtracting, binary digit by binary digit, said conventional binary code address number from said conventional binary code information number, whereby said first difference number is expressed in a binary code comprising the digits −1, 0, +1, means for grouping the digits of said first difference number in groups of two digits of subsequent orders, means for deriving from the first digit group constituted by the two digits of higher orders of said first difference number a first corresponding resulting set of two digits which are the same as the two digits of said first group in the cases where one of said digits of said first group is zero and where said two digits of said first group are both +1 and −1, which are (0, −1) when the two digits of said first group are (−1, +1) and which are (0, +1) when the two digits of said first group are (+1, −1), cascaded means for deriving from a plurality of digits pairs constituted by the digit of lower order of a set of two digits and the digit of higher order of a group of two digits, said digits of the pair having successive orders, a corresponding plurality of resulting sets of two digits and means for forming with the successive digits of higher order of said resulting sets the said final difference number.

2. A comparator for subtracting a binary address number expressed in the conventional binary code from a binary information number expressed in the reflected binary code and for issuing a final difference number expressed in a binary code having the three digits +1, −1 and 0 and in which at least one 0 is always inserted between two digits equal to unity and of opposite sign comprising means for converting said reflected binary code information number into a conventional binary code information number, means for obtaining a first difference number by subtracting, binary digit by binary digit, said conventional binary code address number from said conventional binary code information number, whereby said first difference number is expressed in a binary code comprising the digits −1, 0, +1, means for grouping the digits of the said first difference number in groups of three digits of subsequent orders, means for deriving from the first digit group constituted by the three digits of higher orders of said first difference number a first corresponding resulting set of three digits which are respectively the same as the three digits of said first group in the cases where there does not exist in said group two successive digits equal to unity and of opposite sign, which are (0 −1 0) when the three digits of said first group are (−1 +1 0), which are (0 −1 −1) when the three digits of said first group are (−1 +1 −1), which are (0 +1 0) when the three digits of said first group are (+1 −1 0), which are (0 +1 +1) when the three digits of said first group are (+1 −1 +1), which are (0 0 −1) when the three digits of said first group are (−1 +1 +1) and which are (0 0 +1) when the three digits of said first group are (+1 −1 −1), cascaded means for deriving from a plurality of digit triplets constituted by the single digit of lower order of a set of three digits and the two digits of higher orders of a group of three digits, said digits of the triplet having successive orders, a corresponding plurality of resulting sets of three digits and means for forming with the two successive digits of higher orders of said resulting sets the said final difference number.

References Cited in the file of this patent

UNITED STATES PATENTS

| | | |
|---|---|---|
| 2,830,285 | Davis et al. | Apr. 8, 1958 |
| 2,844,309 | Ayeres | July 22, 1958 |
| 2,855,539 | Hoover | Oct. 7, 1958 |
| 2,877,445 | Cheilik | Mar. 10, 1959 |